United States Patent
Kawakami et al.

(10) Patent No.: US 9,619,126 B2
(45) Date of Patent: Apr. 11, 2017

(54) COMPUTER-READABLE NON-TRANSITORY STORAGE MEDIUM WITH IMAGE PROCESSING PROGRAM STORED THEREON, ELEMENT LAYOUT CHANGED MATERIAL GENERATING DEVICE, IMAGE PROCESSING DEVICE, AND IMAGE PROCESSING SYSTEM

(71) Applicant: KYOCERA Document Solutions Inc., Osaka (JP)

(72) Inventors: Satoshi Kawakami, Osaka (JP); Wataru Endo, Osaka (JP); Yoshitaka Matsuki, Osaka (JP); Masato Tanba, Osaka (JP); Yosuke Nakazato, Osaka (JP)

(73) Assignee: KYOCERA Document Solutions Inc., Tamatsukuri, Chou-ku, Osaka (JP)

( * ) Notice: Subject to any disclaimer, the term of this patent is extended or adjusted under 35 U.S.C. 154(b) by 236 days.

(21) Appl. No.: 14/290,299

(22) Filed: May 29, 2014

(65) Prior Publication Data
US 2014/0359451 A1 Dec. 4, 2014

(30) Foreign Application Priority Data
May 31, 2013 (JP) ................................. 2013-116491

(51) Int. Cl.
*G06F 3/048* (2013.01)
*G06F 3/0484* (2013.01)
(Continued)

(52) U.S. Cl.
CPC .......... *G06F 3/04845* (2013.01); *G06F 3/042* (2013.01); *G06F 3/0487* (2013.01); *G06F 3/04842* (2013.01)

(58) Field of Classification Search
CPC ... G06F 3/04845; G06F 3/048; G06F 3/04848
(Continued)

(56) References Cited

U.S. PATENT DOCUMENTS

| 7,007,067 B1 * | 2/2006 | Azvine | G06F 3/011 |
| | | | 709/202 |
| 7,714,802 B2 * | 5/2010 | Hurley | G09G 5/00 |
| | | | 345/2.1 |

(Continued)

FOREIGN PATENT DOCUMENTS

| JP | 2010-039651 A | 2/2010 |
| JP | 2010-231812 A | 10/2010 |

(Continued)

*Primary Examiner* — David Phantana Angkool
(74) *Attorney, Agent, or Firm* — IP Business Solutions, LLC

(57) ABSTRACT

An image processing device includes: an indication point acquiring section that acquires an indication point on a presentation material, which a presenter is pointing out with a pointer, through image processing on the presentation material taken by an image pickup device; an element layout changed material acquiring section that acquires an element layout changed material in which an layout of elements contained in the presentation material is changed; a changed indication point determining section that determines as a changed indication point a point on the element layout changed material corresponding to the indication point acquired by the indication point acquiring section; and a display image generating section generates an image in which an image of the element layout changed material is synthesized with a changed indication point indicating image showing the changed indication point and allows a display device to display the generated image.

13 Claims, 13 Drawing Sheets

(51) Int. Cl.
*G06F 3/0487* (2013.01)
*G06F 3/042* (2006.01)

(58) Field of Classification Search
USPC .......................................................... 715/730
See application file for complete search history.

(56) References Cited

U.S. PATENT DOCUMENTS

| | | | |
|---|---|---|---|
| 8,890,811 B2 | 11/2014 | Katsumata | |
| 9,183,199 B2 * | 11/2015 | Wu | G06F 17/289 |
| 2009/0021480 A1 * | 1/2009 | Tagawa | G06F 3/0386 |
| | | | 345/158 |
| 2012/0007801 A1 * | 1/2012 | Banning | G03B 21/00 |
| | | | 345/156 |
| 2012/0299823 A1 | 11/2012 | Katsumata | |
| 2014/0359451 A1 * | 12/2014 | Kawakami | G06F 3/04845 |
| | | | 715/730 |

FOREIGN PATENT DOCUMENTS

| | | |
|---|---|---|
| JP | 2011-150609 A | 8/2011 |
| JP | 2012-043063 A | 3/2012 |
| JP | 4973765 B2 | 7/2012 |

* cited by examiner

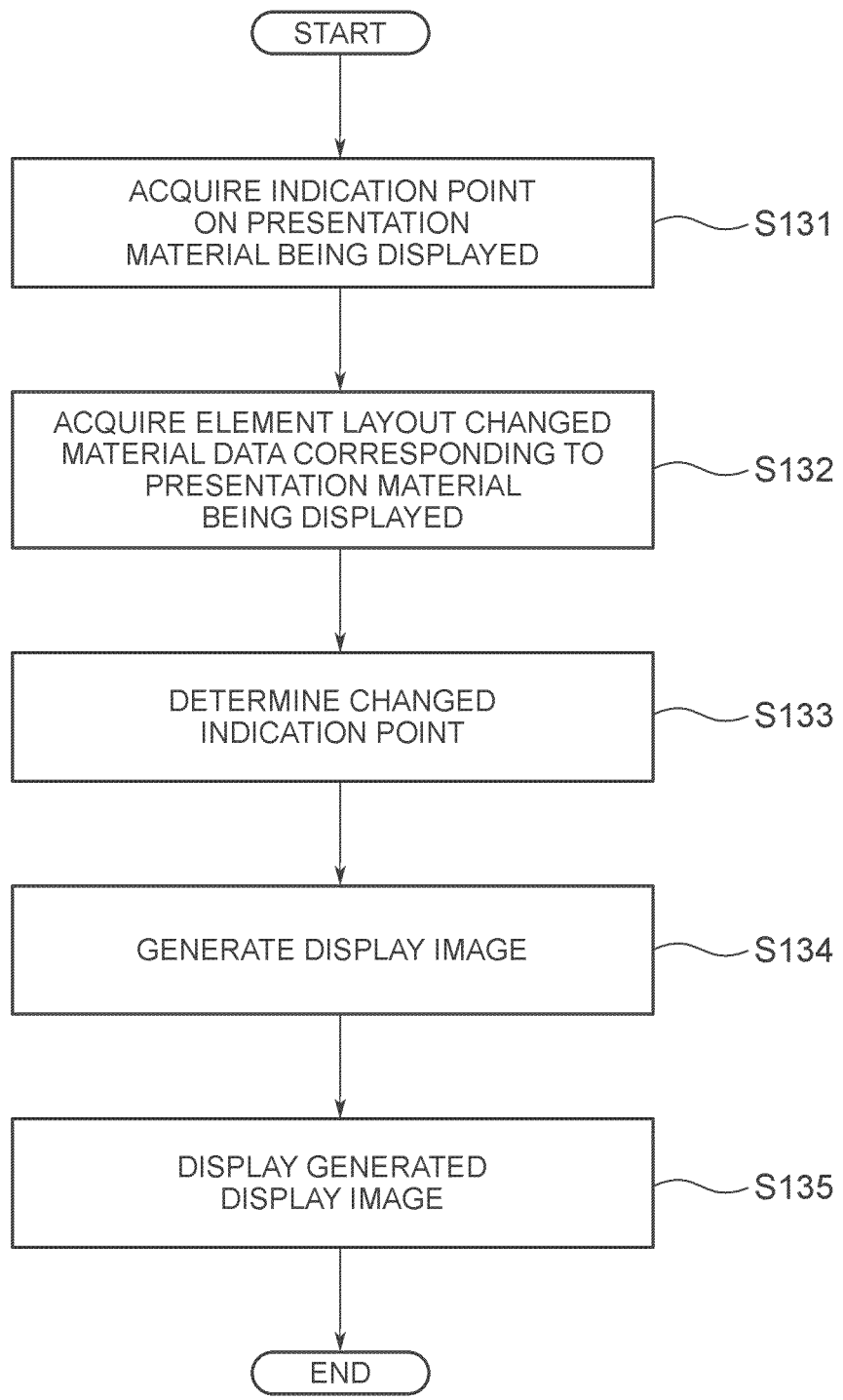

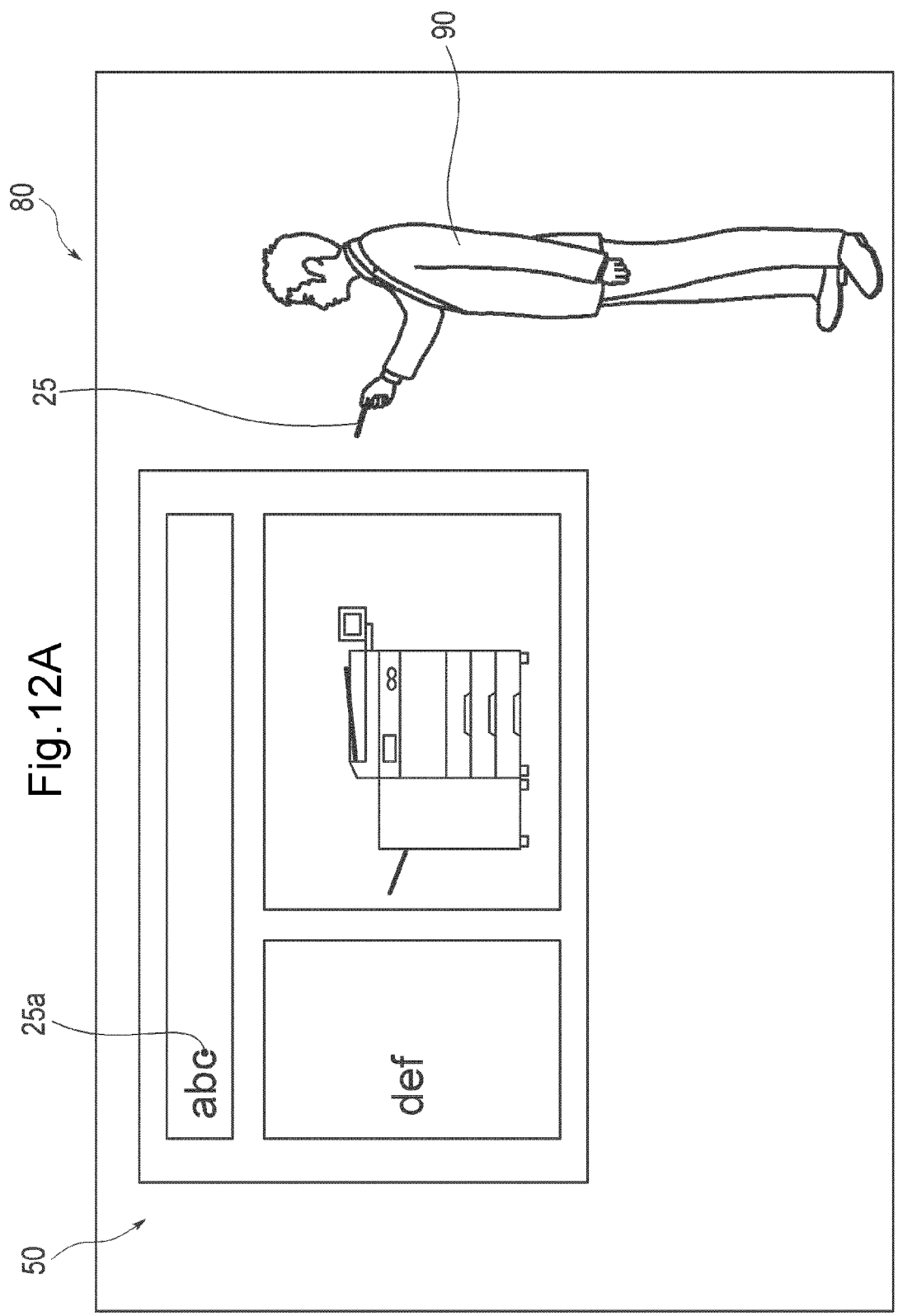

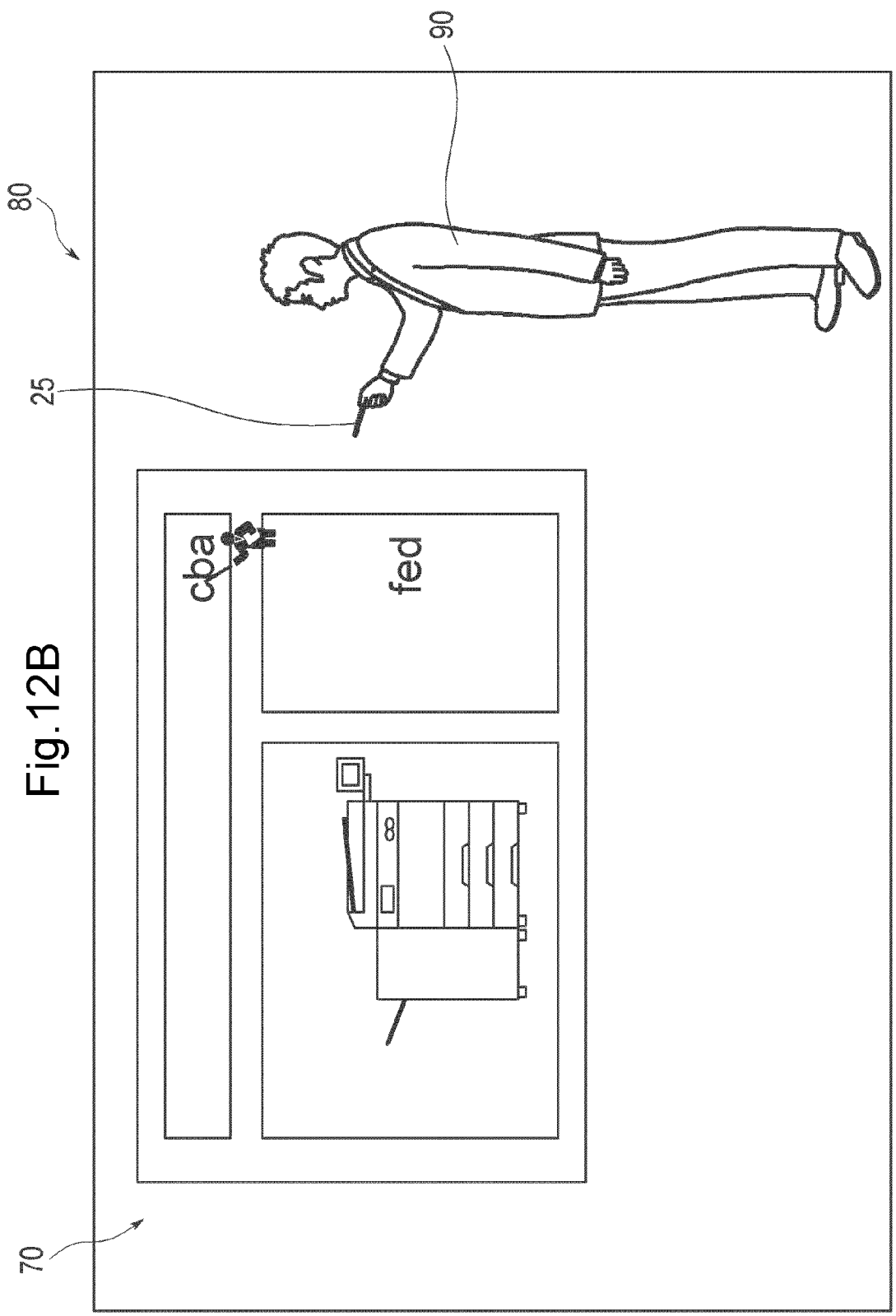

COMPUTER-READABLE NON-TRANSITORY STORAGE MEDIUM WITH IMAGE PROCESSING PROGRAM STORED THEREON, ELEMENT LAYOUT CHANGED MATERIAL GENERATING DEVICE, IMAGE PROCESSING DEVICE, AND IMAGE PROCESSING SYSTEM

INCORPORATION BY REFERENCE

This application claims priority to Japanese Patent Application No. 2013-116491 filed on May 31, 2013, the entire contents of which are incorporated by reference herein.

BACKGROUND

The present disclosure relates to a computer-readable non-transitory storage medium with an image processing program stored thereon, an image processing device, and an image processing system.

An image of a presentation material or the like generally contains, as elements forming the image, characters, graphics, and at least one region including at least either characters or graphics. A technique is known for changing the layout of these elements contained in the image of the presentation material or the like and displaying on a display an image having the changed layout of the elements.

SUMMARY

In a computer-readable non-transitory storage medium with an image processing program stored thereon according to an aspect of the present disclosure, the image processing program allows a computer to operate as an indication point acquiring section, an element layout changed material acquiring section, a changed indication point determining section, and a display image generating section.

The indication point acquiring section acquires an indication point on a presentation material, which a presenter is pointing out with a pointer, through image processing on an image of the presentation material taken by an image pickup device.

The element layout changed material acquiring section acquires an element layout changed material in which a layout of elements contained in the presentation material is changed.

The changed indication point determining section determines as a changed indication point a point on the element layout changed material corresponding to the indication point acquired by the indication point acquiring section.

The display image generating section generates an image in which an image of the element layout changed material acquired by the element layout changed material acquiring section is synthesized with a changed indication point indicating image showing the changed indication point determined by the changed indication point determining section and allows a display device to display the generated image.

An image processing device according to another aspect of the present disclosure includes a display device, an image pickup device, an indication point acquiring section, an element layout changed material acquiring section, a changed indication point determining section, and a display image generating section.

The image pickup device takes a presentation material being presented.

The indication point acquiring section is acquires an indication point on the presentation material, which a presenter is pointing out with a pointer, through image processing on an image of the presentation material taken by the image pickup device.

The element layout changed material acquiring section is configured to acquire an element layout changed material in which a layout of elements contained in the presentation material is changed.

The changed indication point determining section is determines as a changed indication point a point on the element layout changed material corresponding to the indication point acquired by the indication point acquiring section.

The display image generating section generates an image in which an image of the element layout changed material acquired by the element layout changed material acquiring section is synthesized with a changed indication point indicating image showing the changed indication point determined by the changed indication point determining section and allows the display device to display the generated image.

An image processing system according to still another aspect of the present disclosure includes an element layout changed material generating device that generates an element layout changed material in which a layout of elements contained in a presentation material is changed; and the aforementioned image processing device that subjects the element layout changed material generated by the element layout changed material generating device to image processing.

BRIEF DESCRIPTION OF THE DRAWINGS

FIG. 9 shows an operation of the portable device according to the embodiment of the present disclosure when displaying an element layout changed material.

FIG. 12A shows an example of an image taken by an image pickup section in the embodiment of the present disclosure.

FIG. 12B is an example of an image in which the image shown in FIG. 12A has been synthesized with the display image by AR technology.

DETAILED DESCRIPTION

Hereinafter, with reference to the drawings, a description will be given of a computer-readable non-transitory storage medium with an image processing program stored thereon, an image processing device, and an image processing system, each according to an embodiment of the present disclosure.

First, a description will be given of the architecture of an image processing system 10 according to the embodiment of the present disclosure.

Figure 1:
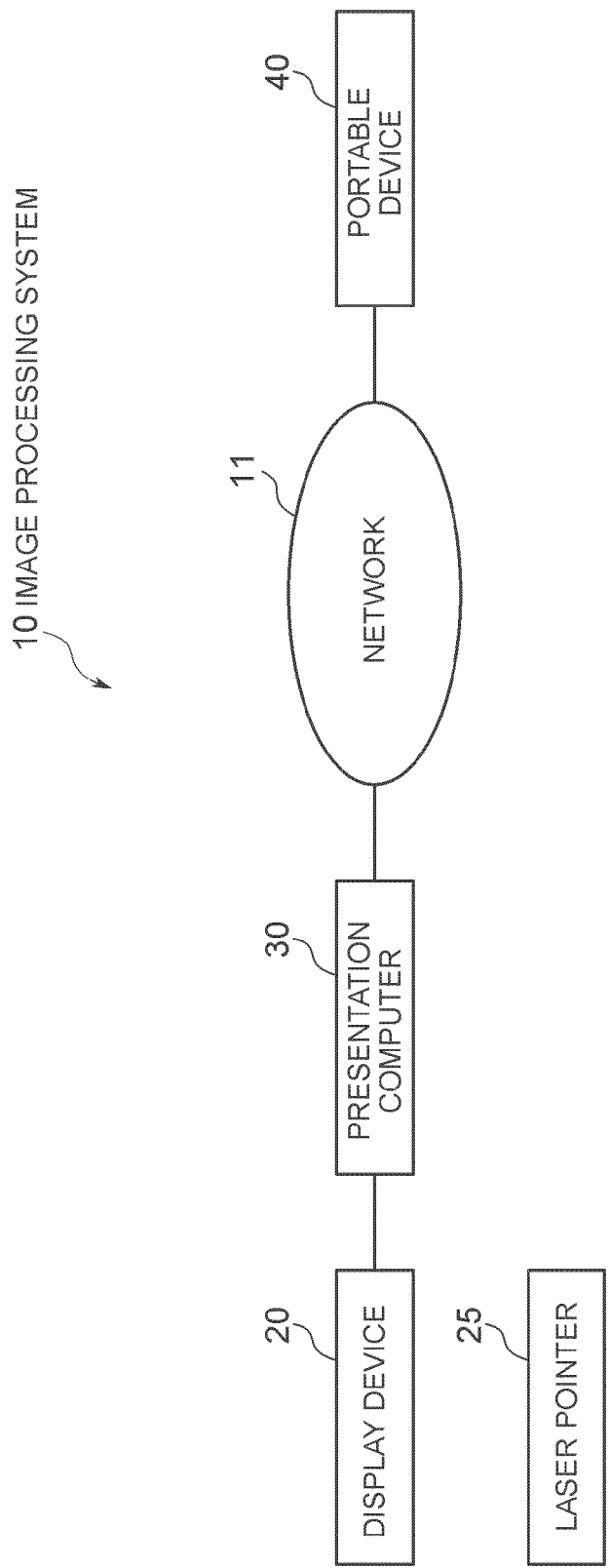
FIG. 1 shows an architecture of an image processing system according to an embodiment of the present disclosure.

FIG. 1 shows the architecture of the image processing system 10 according to the embodiment of the present disclosure.

As shown in FIG. 1, the image processing system 10 includes: a display device 20, such as a projector, for use to display a presentation material; a laser pointer 25 for use by a presenter to point out a point on the presentation material being displayed by the display device 20; a presentation computer 30 serving as an element layout changed material generating device in the embodiment of the present disclosure, communicably connected to the display device 20, and configured to provide image data of the presentation material to the display device 20; and a portable device 40 serving as an image processing device according to the embodiment of the present disclosure and carried by each presentation audience member. The presentation computer 30 and the portable device 40 are communicably connected via a network 11, such as a LAN (local area network) or the Internet.

The portable device 40 is capable of displaying an element layout changed material in which a layout of elements contained in the presentation material has been changed, such as by the presentation computer 30. The term "element" herein refers to a region containing at least either characters or graphics.

A presenter gives a presentation while pointing out, with a pointer generated on the presentation material by laser emitted from the laser pointer 25, a point on the presentation material being displayed by the display device 20. The presentation audience can hear the presentation of the presenter while viewing the presentation material being displayed by the display device 20. Furthermore, the audience can also hear the presentation of the presenter while viewing not the presentation material being displayed by the display device 20 but the element layout changed material being displayed on the portable device 40.

Figure 2:
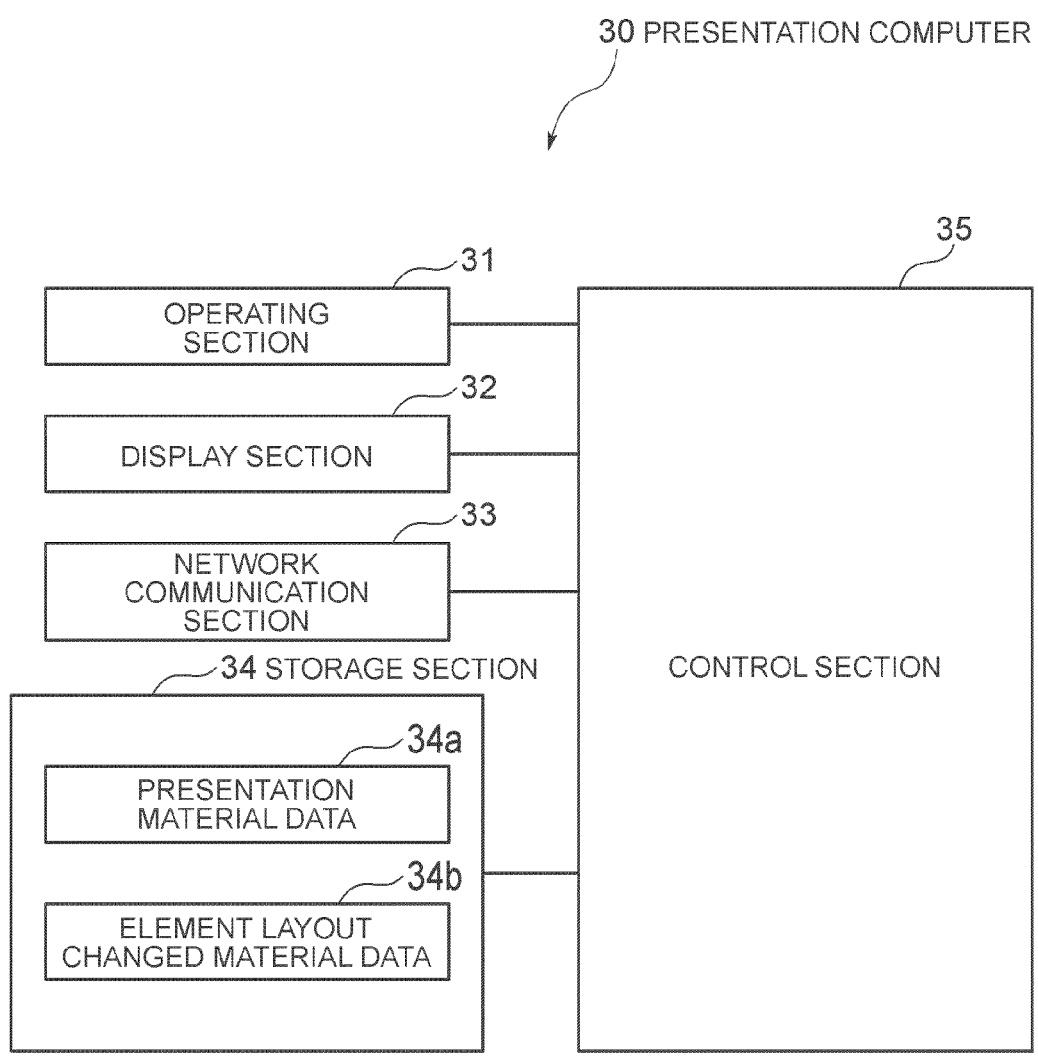
FIG. 2 shows an architecture of a presentation computer in the embodiment of the present disclosure.

FIG. 2 shows the architecture of the presentation computer 30 in the one embodiment of the present disclosure.

As shown in FIG. 2, the presentation computer 30 includes: an operating section 31 as an input device, such as a mouse or a keyboard, through which various operations are to be input; a display section 32 as a device, such as an LCD (liquid crystal display), on which various information is to be displayed; a network communication section 33 as a device for use in communication with an external device via the network 11 (see FIG. 1); a storage section 34 that is a non-volatile memory, such as an HDD (hard disk drive), storing a program and various data therein; and a control section 35 configured to control the whole of the presentation computer 30. The presentation computer 30 is formed of, for example, a PC (personal computer).

The storage section 34 stores presentation material data 34a that is image data of the presentation material.

Furthermore, the storage section 34 can store element layout changed material data 34b that is image data of an element layout changed material.

The control section 35 includes, for example, a CPU (central processing unit), a ROM (read only memory) storing a program and various data, and a RAM (random access memory) for use as a work area for the CPU. The CPU executes the program stored in the ROM or the storage section 34.

Figure 3:
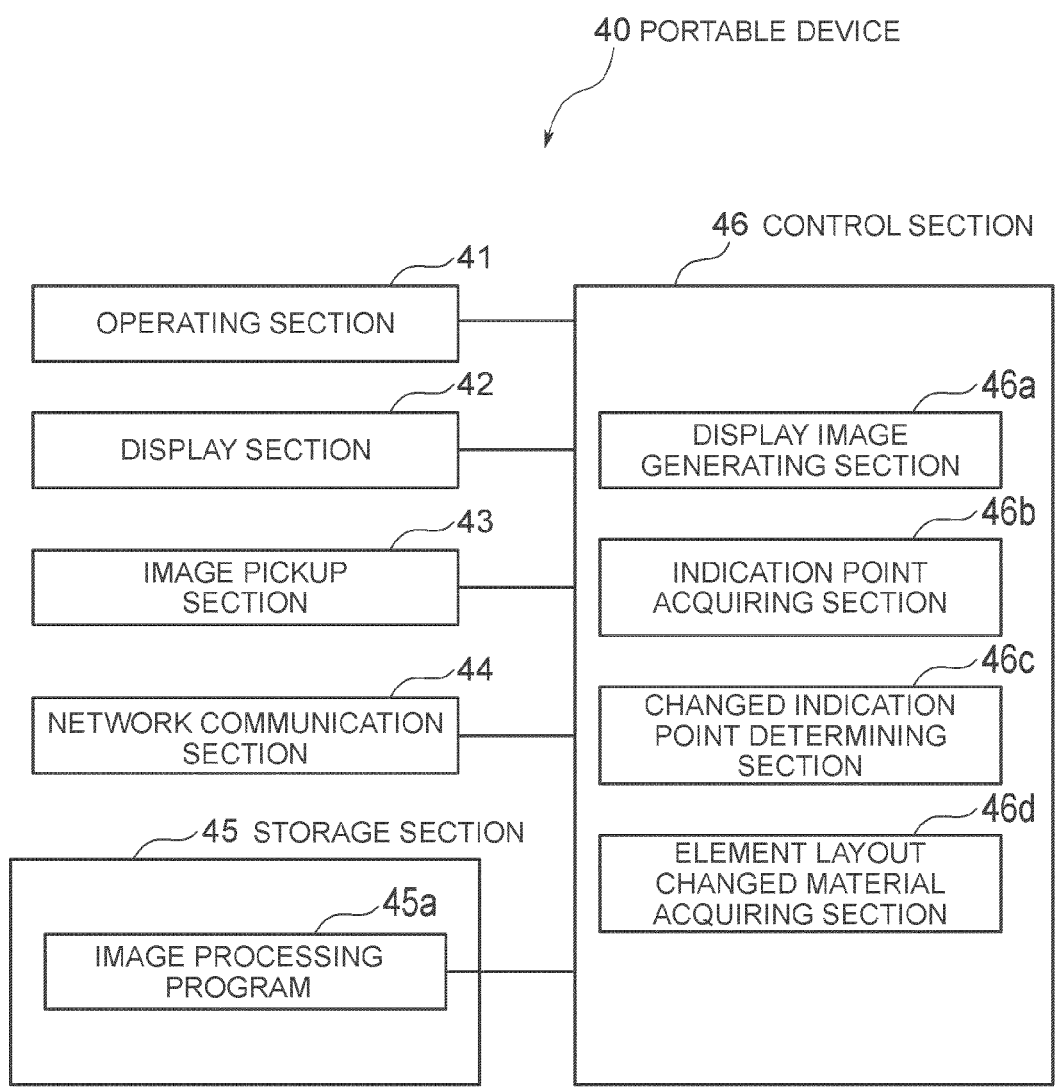
FIG. 3 showing an architecture of a portable device according to the embodiment of the present disclosure.

FIG. 3 shows the architecture of the portable device 40.

As shown in FIG. 3, the portable device 40 includes: an operating section 41 as an input device, such as buttons, through which various operations are to be input; a display section 42 as a device, such as an LCD, on which various information is to be displayed; an image pickup section 43 as a device configured to take still images or videos; a network communication section 44 as a device for use in communication with an external device via the network 11 (see FIG. 1); a storage section 45 that is a non-volatile memory, such as an HDD, storing a program and various data therein; and a control section 46 configured to control the whole of the portable device 40. The portable device 40 is formed of, for example, a PC, such as a tablet.

The operating section 41 may include an input device forming a touch panel together with the display section 42.

The storage section 45 stores an image processing program 45a to be executed by the control section 46. The image processing program 45a may be installed into the portable device 40 at the production stage of the portable device 40, may be additionally installed thereinto through a storage medium, such as a USB (universal serial bus) memory, or may be additionally installed thereinto over the network 11.

The control section 46 includes, for example, a CPU, a ROM storing a program and various data, and a RAM for use as a work area for the CPU. The CPU executes the program stored in the ROM or the storage section 45.

The control section 46 executes the image processing program 45a stored in the storage section 45 to function as: a display image generating section 46a by generating a display image to be displayed on the display section 42; an indication point acquiring section 46b by acquiring an indication point on a presentation material pointed by a pointer through image processing on an image of the presentation material taken by the image pickup section 43; a changed indication point determining section 46c by determining as a changed indication point a point on an element layout changed material corresponding to the indication point acquired by the indication point acquiring section 46b; and an element layout changed material acquiring section 46d by acquiring through the network communication section 44 element layout changed material data 34b generated by the presentation computer 30.

Next, a description will be given of operations of the image processing system 10.

First, a description will be given of an operation of the presentation computer 30 when generating element layout changed material data 34b.

Figure 4:
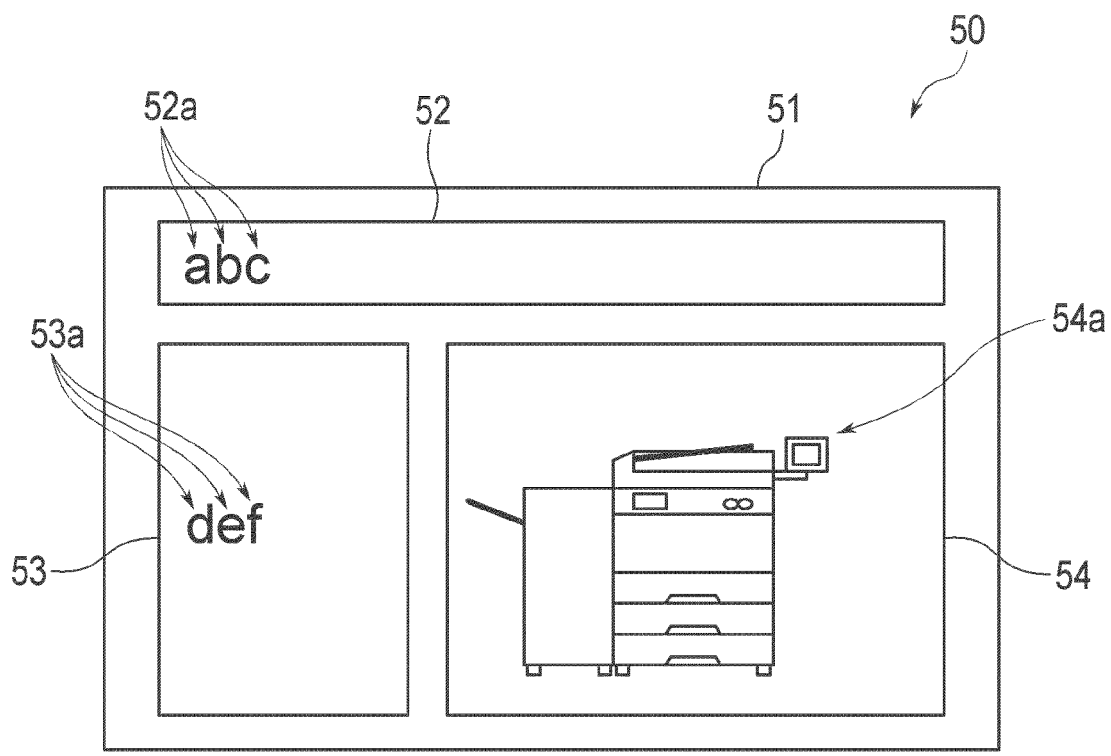
FIG. 4 shows an example of a presentation material represented by presentation material data.

FIG. 4 shows an example of a presentation material 50 represented by presentation material data 34a.

The presentation material 50 shown in FIG. 4 contains a basic region 51, regions 52, 53, and 54 arranged in the region 51, characters 52a arranged in the region 52, characters 53a arranged in the region 53, graphics 54a placed in the region 54.

The region 51, the region 52, the region 53, the region 54, the characters 52a, the characters 53a, and the graphics 54a are elements contained in the presentation material 50.

Figure 5:
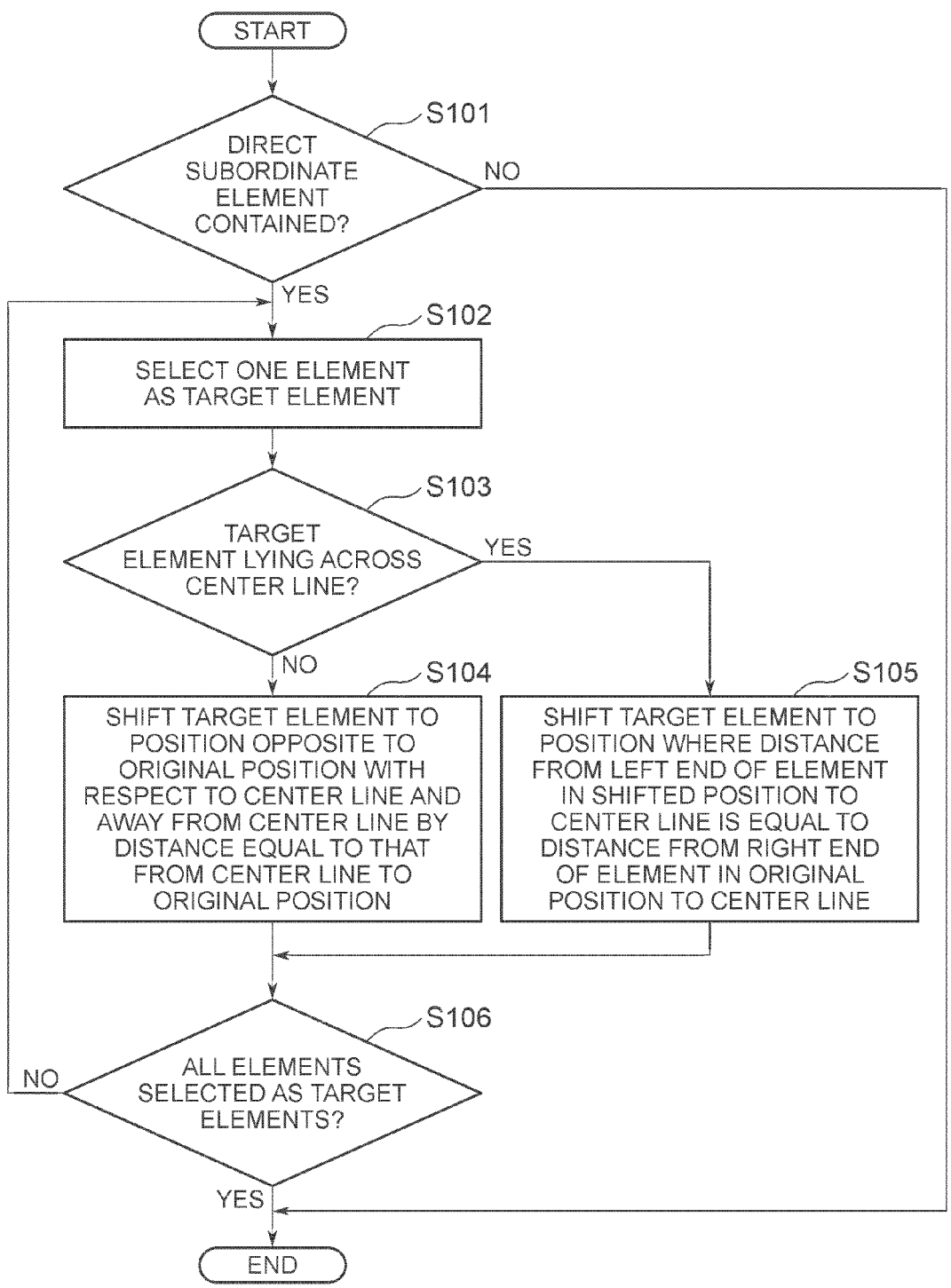
FIG. 5 shows an operation of the presentation computer in the embodiment of the present disclosure when generating element layout changed material data.

In a specific case, such as when an instruction to generate element layout changed material data 34b is input through the operating section 31, the control section 35 of the presentation computer 30 executes the operation shown in FIG. 5 on all the regions in the presentation material 50 represented by the presentation material data 34a by selecting each of these regions as a target region for the operation. In generating the element layout changed material data 34b, the control section 35 generates it not by changing the presentation material data 34a itself but separately from the presentation material data 34a.

FIG. 5 shows the operation of the presentation computer 30 when generating the element layout changed material data 34b.

As shown in FIG. 5, the control section 35 of the presentation computer 30 determines whether or not any direct subordinate element is contained in the target region (S101). The term "direct subordinate element" herein refers to the regions 52, 53, and 54 when the target region is the region 51, refers to the characters 52a when the target region is the region 52, refers to the characters 53a when the target region is the region 53, and refers to the graphics 54a when the target region is the region 54.

If in S101 the control section 35 determines that no direct subordinate element is contained in the target region, it ends the operation shown in FIG. 5.

On the other hand, if in S101 the control section 35 determines that any direct subordinate element is contained in the target region, the control section 35 selects one of the direct subordinate elements as a target element (S102) and determines whether or not the target element lies across the vertical center line of the target region (S103).

If in S103 the control section 35 determines that the target element does not lie across the center line, it shifts the target element to a position laterally opposite to the original position with respect to the center line and away from the center line by a distance equal to that from the center line to the original position (S104).

Figure 6A:
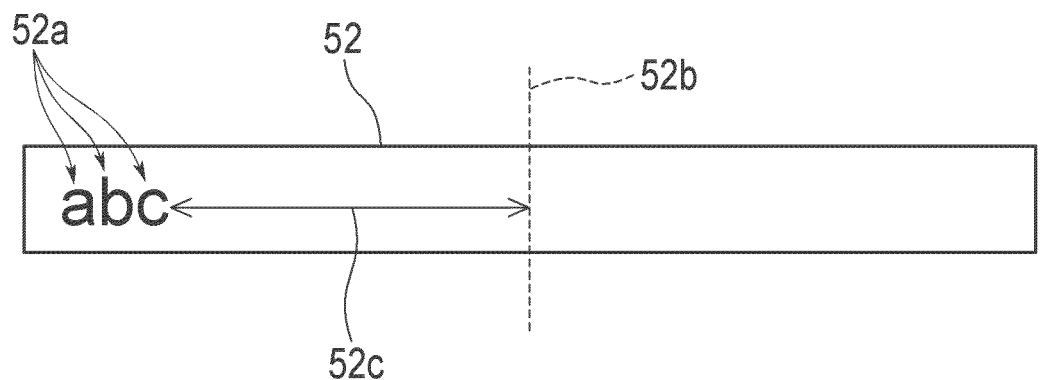
FIG. 6A shows one of regions containing characters in the presentation material shown in FIG. 4.
Figure 6B:
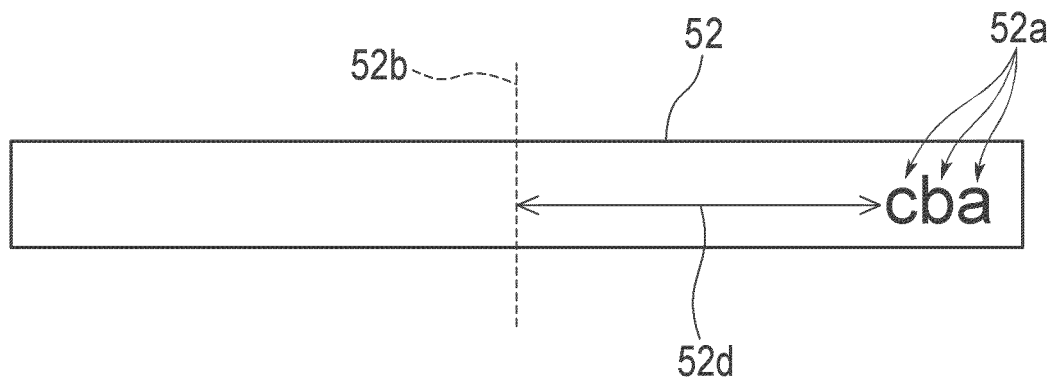
FIG. 6B shows a state where the layout of the characters in the region shown in FIG. 6A has been changed.

A description will be given of, as an example, the case where the target region is the region 52 shown in FIG. 6A. In FIG. 6A, the character "c" of the characters 52a, which is a direct subordinate element of the region 52, does not lie across the vertical center line 52b of the region 52. Furthermore, in FIG. 6A, the position of "c" of the characters 52a is located on the left side of the center line 52b and a distance 52c away from the center line 52b. Therefore, the control section 35, as shown in FIG. 6B, shifts the character "c" of the characters 52a to a position laterally opposite to the original position with respect to the center line 52b, i.e., on the right side of the center line 52b, and away from the center line 52b by a distance 52d equal to the distance 52c. Although the above description has been given of the character "c" of the characters 52a, the same applies to the characters "a" and "b" of the characters 52a.

As shown in FIG. 5, if in S103 the control section 35 determines that the target element lies across the center line, it shifts the target element to a position where the distance from the left end of the element in the shifted position to the center line becomes equal to the distance from the right end of the element in the original position to the center line (S105).

Figure 7A:
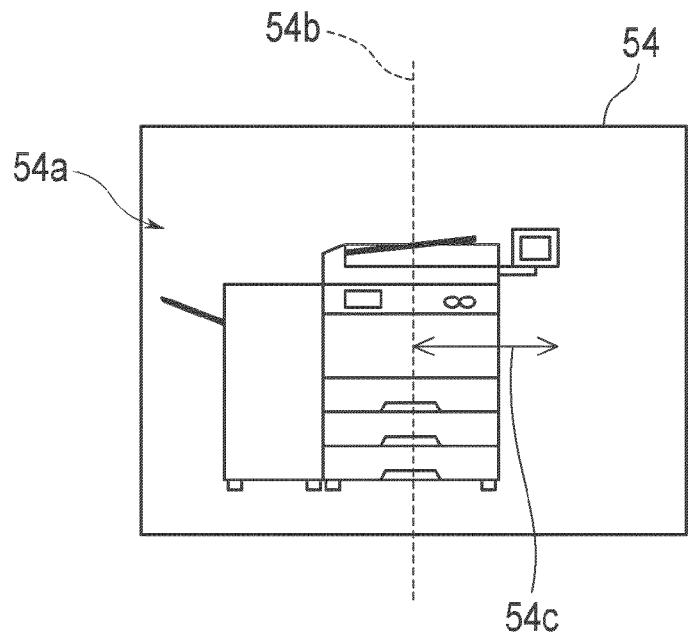
FIG. 7A shows a region containing graphics in the presentation material shown in FIG. 4.
Figure 7B:
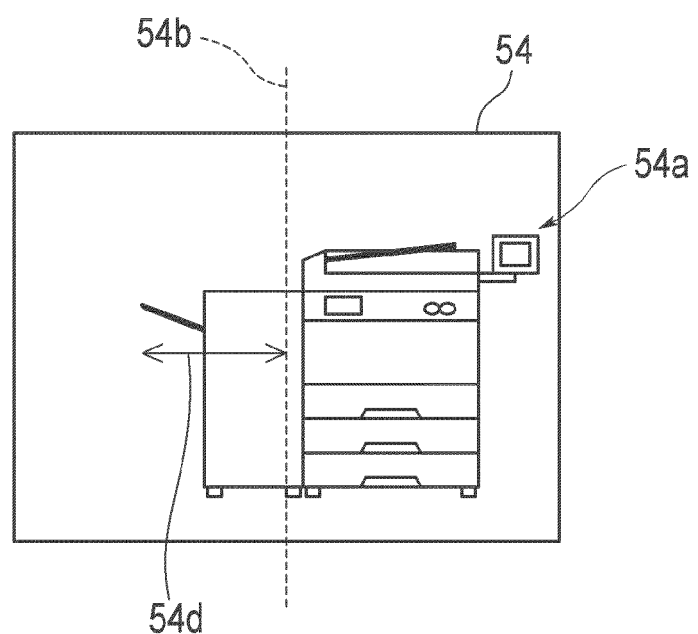
FIG. 7B shows a state where the layout of the graphics in the region shown in FIG. 7A has been changed.

A description will be given of, as an example, the case where the target region is the region 54 shown in FIG. 7A. In FIG. 7A, the graphics 54, which is a direct subordinate element of the region 54, lies across the vertical center line 54b of the region 54. Furthermore, in FIG. 7A, the right end of the graphics 54a is located a distance 54c away from the center line 54b. Therefore, the control section 35, as shown in FIG. 7B, shifts the graphics 54a to a position where the distance 54d from the left end of the graphics 54a in the shifted position to the center line 54b becomes equal to the distance 54c.

As shown in FIG. 5, after the processing in S104 or S105, the control section 35 determines whether or not all the direct subordinate elements in the target region have been selected as target elements (S106).

If in S106 the control section 35 determines that the target region contains any direct subordinate element yet to be selected as a target element, the control section 35 selects one direct subordinate element yet to be selected in the target region as a target element (S102) and executes the processing in S103 for the target element.

On the other hand, if in S106 the control section 35 determines that all the direct subordinate elements in the target region have been selected as target elements, it ends the operation shown in FIG. 5.

The control section 35 operates in the above manner to generate element layout changed material data 34b from the presentation material data 34a.

Figure 8A:
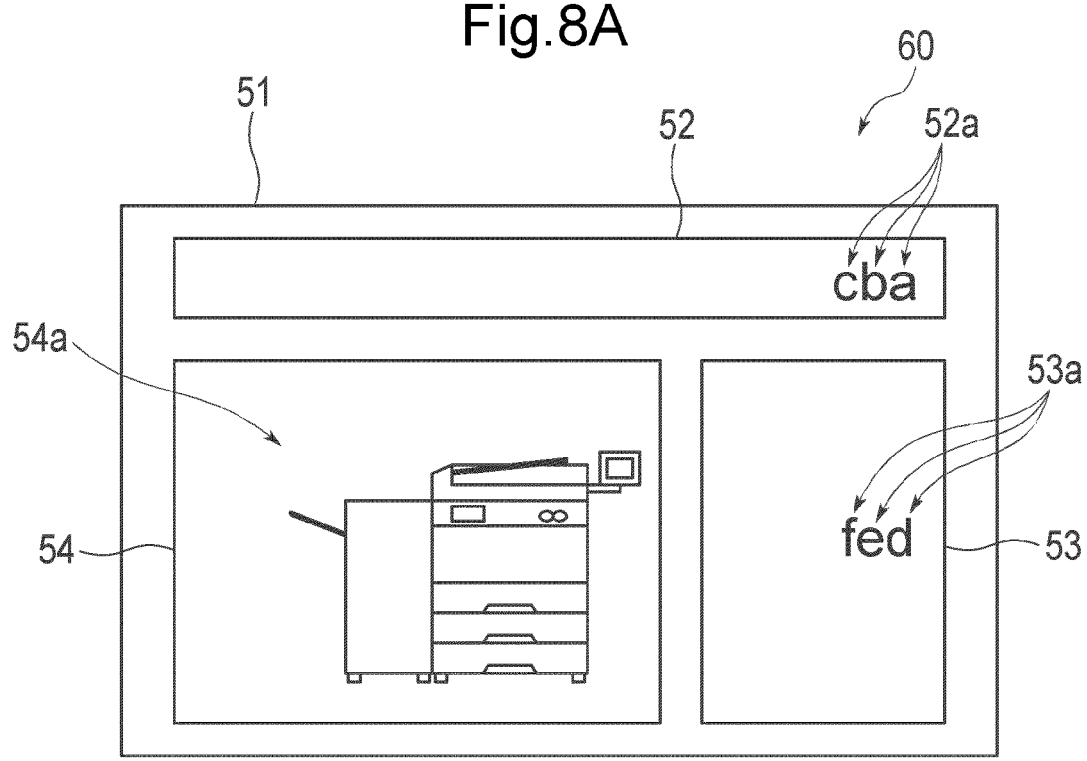
FIG. 8A shows an example of an element layout changed material generated from the presentation material shown in FIG. 4.
Figure 8B:
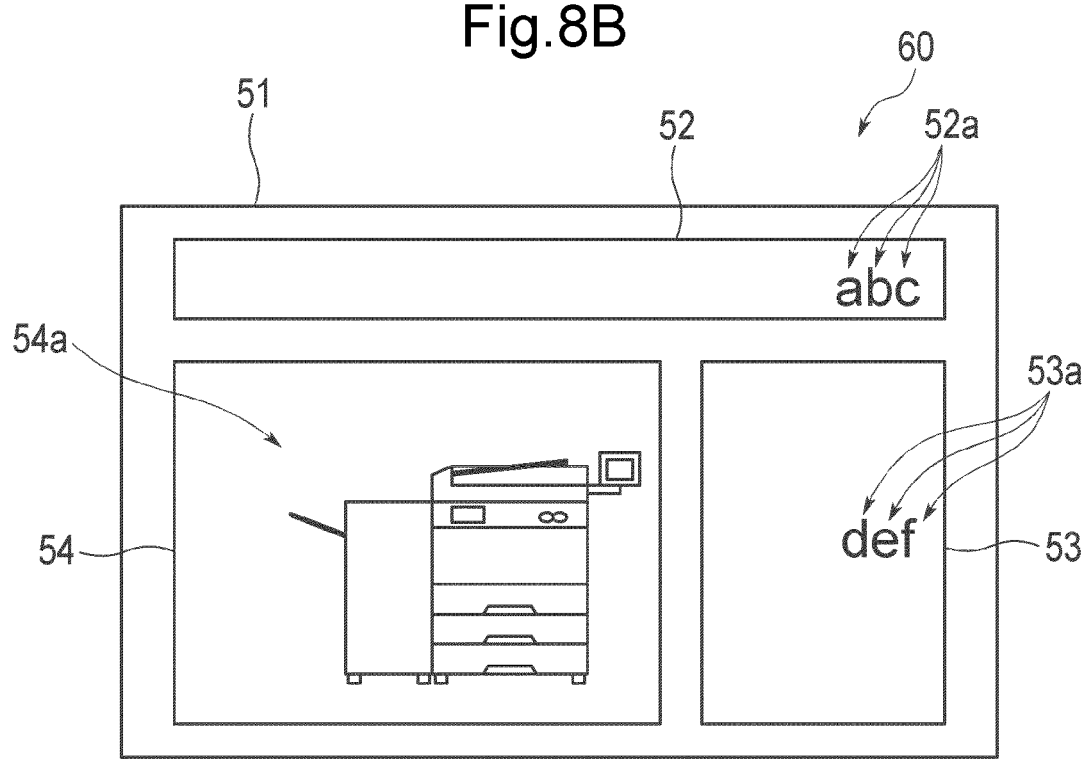
FIG. 8B shows another example of an element layout changed material that has been generated from the presentation material shown in FIG. 4 and is different from the example shown in FIG. 8A.

FIG. 8A shows an example of an element layout changed material 60 represented by the element layout changed material data 34b. FIG. 8B shows another example of an element layout changed material 60 that is represented by the element layout changed material data 34b and is different from the example shown in FIG. 8A.

For example, the control section 35 generates the element layout changed material 60 shown in FIG. 8A from the presentation material 50 shown in FIG. 4. The control section 35 may generate the element layout changed material 60 shown in FIG. 8B from the presentation material 50 shown in FIG. 4. In the element layout changed material 60 shown in FIG. 8B, each of the string of characters 52a and the string of characters 53a is shifted with the entire string of characters as an element and the sequence of characters in each string of characters 52a, 53a is not changed. The control section 35 can set, for example, through the operating section 31, whether to treat the string of characters character by character as an element or treat the entire string of characters as an element.

Next, a description will be given of an operation of the portable device 40 when displaying an element layout changed material.

The presentation audience inputs an instruction to start up the image processing program 45a through the operating section 41 and then takes, through the image pickup section 43 of the portable device 40, a presentation material being displayed by the display device 20.

When the control section 46 of the portable device 40 starts up the image processing program 45a according to the instruction through the operating section 41, it repeatedly executes the operation shown in FIG. 9.

FIG. 9 shows an operation of the portable device 40 when displaying an element layout changed material.

As shown in FIG. 9, the indication point acquiring section 46b of the control section 46 acquires, through image processing on an image of the presentation material taken by the image pickup section 43, an indication point on the presentation material pointed by a pointer (S131).

Subsequently, the element layout changed material acquiring section 46d of the control section 46 acquires, through the network communication section 44 from the presentation computer 30, element layout changed material data 34b corresponding to the presentation material being displayed by the display device 20 (S132).

Next, the changed indication point determining section 46c determines as a changed indication point a point on the element layout changed material represented by the element layout changed material data 34b acquired in S132, the point corresponding to the indication point acquired in S131 (S133).

Specifically, the changed indication point determining section 46c specifies an element that is located at the indication point acquired in S131 and contained in the presentation material before the change in the layout of elements. Then, the changed indication point determining section 46c calculates the position of the specified element on the presentation material after the change in the layout of elements through corresponding point search (image processing) using block matching or other methods and determines whether or not the position of the element on the presentation material after the change in the layout of elements is changed from the position thereof on the presentation material before the change in the layout of elements. If the position of the element is changed, the changed indication point determining section 46c calculates the coordinate difference between the position of the element on the presentation material before the change in the layout of elements and the position of the element on the presentation material after the change in the layout of elements. Then, the changed indication point determining section 46c calculates the changed indication point by adding the above coordinate difference to the indication point acquired in S131.

Although in the above case the coordinate difference between the position of the element on the presentation material before the change in the layout of elements and the position of the element on the presentation material after the change in the layout of elements is calculated by subjecting the presentation material after the change in the layout of elements and the presentation material before the change in the layout of elements to image processing, the present disclosure is not necessarily limited to the above case. The element layout changed material acquiring section 46d may acquire, from the presentation computer 30 executing the processing for changing the layout of elements, information indicating the coordinate difference between the position of the element on the presentation material before the change in the layout of elements and the position of the element on the presentation material after the change in the layout of elements.

Next, the display image generating section 46a generates as a display image an image in which a changed indication point indicating image showing the changed indication point determined in S133 is synthesized with an image of the element layout changed material (S134).

Then, the control section 46 allows the display section 42 to display the display image generated in S134 (S135) and ends the operation shown in FIG. 9.

Figure 10A:
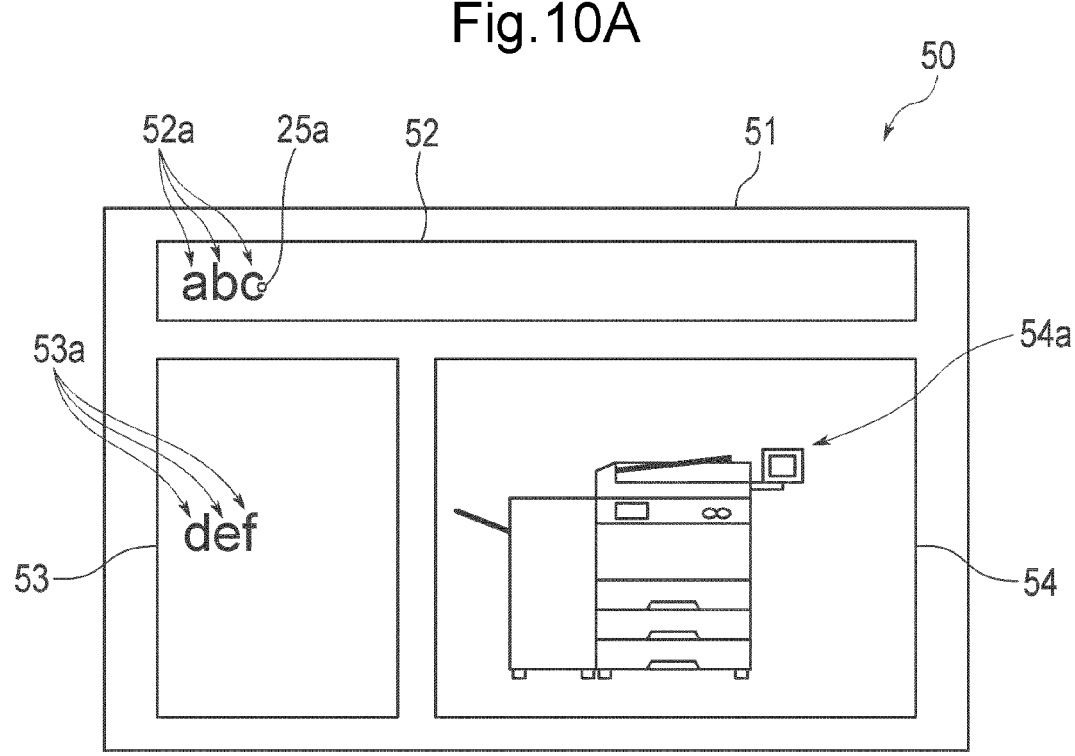
FIG. 10A shows an example of the presentation material displayed on a display device in the embodiment of the present disclosure and an example of a pointer present on the presentation material.
Figure 10B:
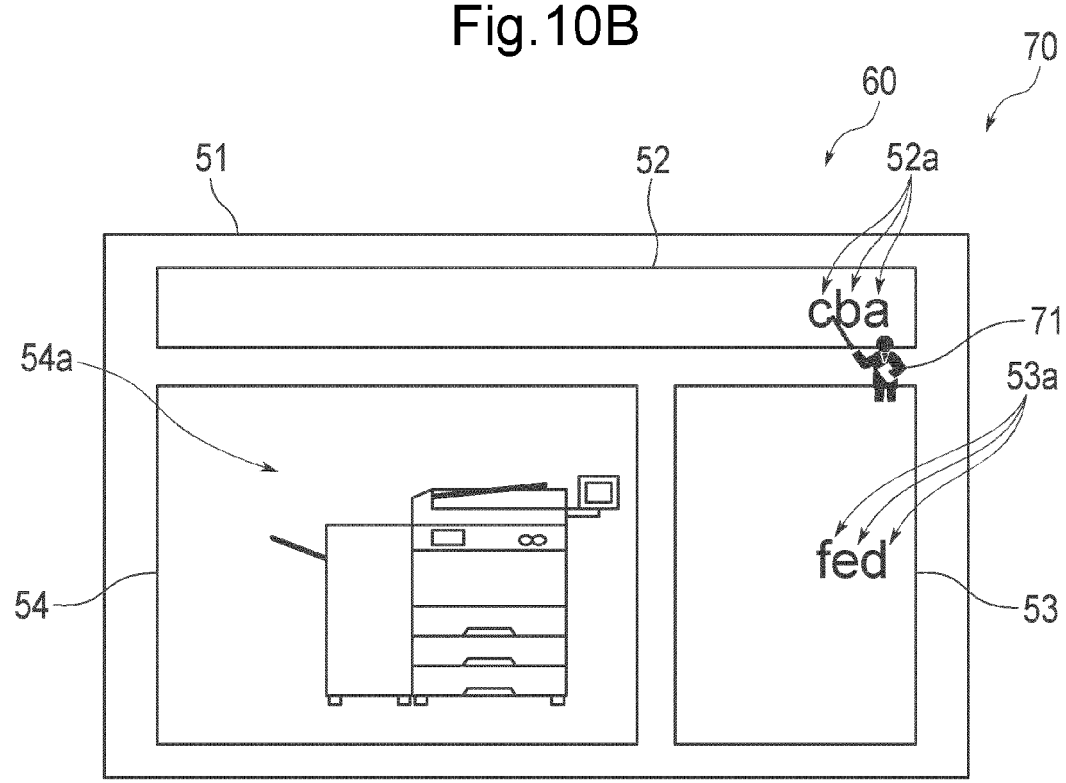
FIG. 10B shows an example of a display image generated based on the presentation material and the pointer shown in FIG. 10A.

For example, when as shown in FIG. 10A a pointer 25a from the laser pointer 25 is present on the presentation material 50 being displayed by the display device 20, the control section 46, as shown in FIG. 10B, allows the display section 42 to display a display image 70 in which a changed indication point indicating image 71 showing a changed indication point is synthesized with the image of the element layout changed material 60. In FIG. 10A, the point on the character "c" of the characters 52a in the region 52 is an indication point pointed by the pointer 25a. Also in FIG. 10B, the point on the character "c" of the characters 52a in the region 52 is a changed indication point of the changed indication point indicating image 71.

Figure 11A:
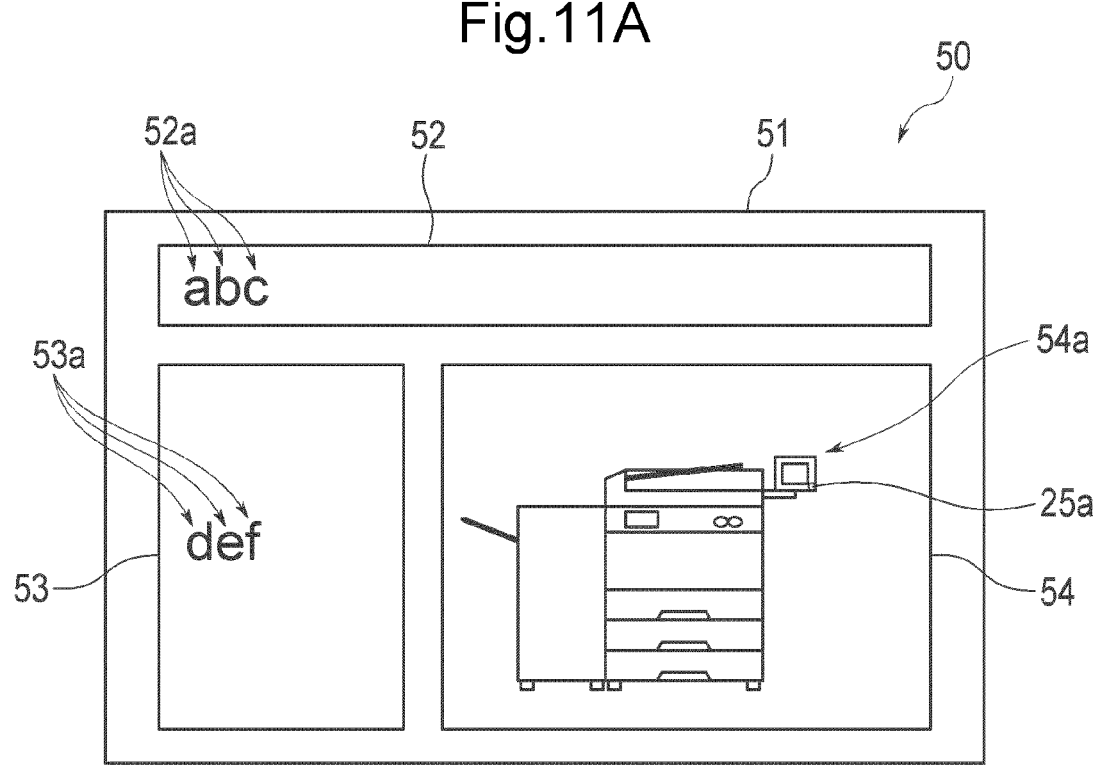
FIG. 11A shows another example of the presentation material displayed on the display device in the embodiment of the present disclosure and another example of the pointer present on the presentation material, which are different from the examples shown in FIG. 10A.
Figure 11B:
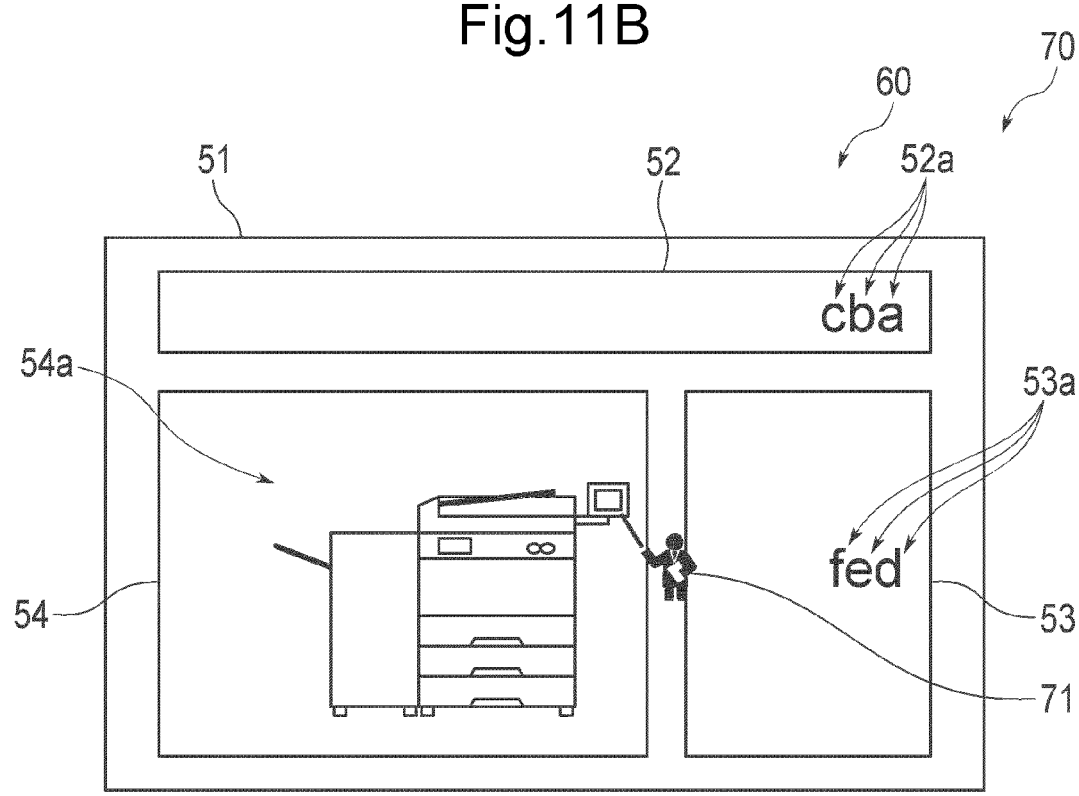
FIG. 11B shows an example of a display image generated based on the presentation material and the pointer shown in FIG. 11A.

Likewise, when as shown in FIG. 11A a pointer 25a from the laser pointer 25 is present on the presentation material 50 being displayed by the display device 20, the control section 46, as shown in FIG. 11B, allows the display section 42 to display a display image 70 in which a changed indication point indicating image 71 showing a changed indication point is synthesized with the image of the element layout changed material 60. In FIG. 11A, the point near the upper right end of the graphics 54a in the region 54 is an indication point pointed by the pointer 25a. Also in FIG. 11B, the point near the upper right end of the graphics 54a in the region 54 is a changed indication point of the changed indication point indicating image 71.

In FIGS. 10B and 11B, the changed indication point indicating image 71 is a figure representing a person so that the changed indication point can be easily recognized. However, the changed indication point indicating image 71 can be represented by any figure. For example, the changed indication point indicating image 71 may be a simple dot.

The control section 46 may employ AR (augmented reality) technology as a method for displaying a display image 70. For example, when the image taken by the image pickup section 43 is an image 80 shown in FIG. 12A, the control section 46 may allow the display section 42 to display an image 80 shown in FIG. 12B in which a portion of the image 80 formed of the image of the presentation material 50 is replaced with a display image 70. The image 80 shown in FIG. 12 contains a presenter 90 taken by the image pickup section 43. Furthermore, the image 80 shown in FIG. 12A contains a pointer 25a taken by the image pickup section 43.

In the meanwhile, presentation is known as one of methods for transferring information to other persons. A generally known presentation method is that a presenter gives a presentation while pointing out, with a pointer, a point on a presentation material being displayed. It is conceivable to use the presentation material in this presentation method as an original image to change the layout of elements contained in the image of the presentation material and display an image having the changed layout of the elements as an element layout changed material for the presentation audience.

However, with a simple change of the layout of elements contained in an image of a presentation material or the like, the indication point on the presentation material pointed by the pointer cannot be suitably indicated on the element layout changed material.

Unlike the above general method, the image processing program 45a allows the computer to operate as the indication point acquiring section 46b, the element layout changed material acquiring section 46d, the changed indication point determining section 46c, and the display image generating section 46a. The indication point acquiring section 46b is configured to acquire an indication point on a presentation material, which a presenter is pointing out with a pointer 25, through image processing on an image of the presentation material taken by the image pickup section 43 (the image pickup device). The element layout changed material acquiring section 46d is configured to acquire an element layout changed material in which the layout of elements contained in the presentation material is changed. The changed indication point determining section 46c is configured to determine as a changed indication point a point on the element layout changed material corresponding to the indication point acquired by the indication point acquiring section 46b. The display image generating section 46a is configured to generate an image in which an image of the element layout changed material acquired by the element layout changed material acquiring section 46d is synthesized with a changed indication point indicating image showing the changed indication point determined by the changed indication point determining section 46c and allow a display device to display the generated image.

Therefore, in the case where the presenter 90 gives a presentation while pointing out, with the pointer 25a, a point on the presentation material 50 being displayed by the display device 20 and the element layout changed material 60 in which the layout of elements contained in the presentation material 50 is changed is displayed for the presentation audience, the indication point on the presentation material 50 pointed by the pointer 25a can be suitably indicated by a changed indication point indicating image 71 on the element layout changed material 60. Hence, the audience can hear the presentation of the presenter while viewing the element layout changed material 60 displayed on the display section 42 of the portable device 40, i.e., a material giving the audience less feeling of strangeness in the layout of elements, and a pointer always placed at a suitable point on the element layout changed material 60.

Furthermore, the changed indication point determining section 46c is configured to determine whether or not the position of the element contained in the presentation material and located at the indication point acquired by the indication point acquiring section 46b is changed on the element layout changed material acquired by the element layout changed material acquiring section 46d. If the position of the element is changed, the changed indication point determining section 46c calculates the coordinate difference between the position of element on the presentation material and the position of the element on the element layout changed material and determines the changed indication point based on the calculated coordinate difference and the indication point. Thus, the indication point on the presentation material 50 pointed by the pointer 25a can be suitably indicated by a changed indication point indicating image 71 on the element layout changed material 60.

As seen from the above description, the element layout changed material 60 is a material in which the lateral layout of the elements contained in the presentation material 50 is changed. Thus, even when there is a difference in the horizontal writing direction of language between a culture on which the presentation material 50 is based and a culture for the audience, such as between the Japanese or English culture where the text is written from left to right and the Arabic culture where the text is written from right to left, the image processing program 45a can suitably indicate the indication point pointed by the pointer 25a on the presentation material 50 as a changed indication point indicating image 71 on the element layout changed material 60.

Although in the above image processing system 10 the portable device 40 acquires the element layout changed material 60 directly from the presentation computer 30, the portable device 40 may acquire it via a server from the presentation computer 30.

When the presentation material includes a plurality of pages, the portable device 40 may acquire, on a page-by-page basis, the page of the element layout changed material corresponding to the page of the presentation material being displayed by the display device 20 directly from the presentation computer 30 or via the server from the presentation computer 30. Alternatively, the portable device 40 may previously acquire all pages of the element layout changed material directly from the presentation computer 30 or via the server from the presentation computer 30 and then, on a page-by-page basis, acquire only the number of the page of the presentation material being displayed by the display device 20 directly from the presentation computer 30 or via the server from the presentation computer 30.

Although in the above embodiment the element layout changed material is generated by the presentation computer 30, it may be generated by the above server or the portable device 40.

In generating the element layout changed material, the portable device 40 may generate the element layout changed material based on presentation material data acquired directly from the presentation computer 30 or via the server from the presentation computer 30 or may generate the element layout changed material by analyzing elements of the presentation material through image processing on an image of the presentation material taken by the image pickup section 43.

Although in the above embodiment the image processing system 10 includes a portable device as the image processing device according to the present disclosure, the image processing system 10 may include a computer other than the portable device as the image processing device according to the present disclosure. For example, the image processing device according to the present disclosure may be a computer with which a venue for the presentation is equipped.

The image processing program described in the above embodiment may be one stored on a computer-readable non-transitory storage medium, such as a hard disk, a CD-ROM, a DVD-ROM or a semiconductor memory.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An element layout changed material generating device comprising:
    a storage section that stores a presentation material; and
    a control section that generates an element layout changed material from the presentation material by shifting a lateral position of at least one of elements of characters and graphics contained in a region of the presentation material based on a distance from a center line indicating a center of the region with respect to a lateral direction,
    wherein when the element is positioned away from the center line, the control section generates the element layout changed material from the presentation material by shifting the lateral position of the element to a position laterally opposite with respect to the center line and away from the center line by a distance equal to that from the center line to an original position.

2. The element layout changed material generating device according to claim 1, wherein the control section executes a processing for changing positions of the element with respect to the lateral direction without inverting the element.

3. An element layout changed material generating device comprising:
a storage section that stores a presentation material; and
a control section that generates an element layout changed material from the presentation material by shifting a lateral position of at least one of elements of characters and graphics contained in a region of the presentation material based on a distance from a center line indicating a center of the region with respect to a lateral direction,
wherein when the element is positioned on the center line, the control section generates the element layout changed material from the presentation material by shifting the lateral position of the element to a position laterally opposite with respect to the vertical center line of the region, the position being where a distance from one end of the element to the center line with respect to the lateral direction becomes equal to a distance from the other end of the element in the original position before shifts in the lateral direction to the center line.

4. The element layout changed material generating device according to claim 3, wherein the control section executes the processing for changing positions of the element with respect to the lateral direction without inverting the element.

5. An image processing system comprising:
an element layout changed material generating device that includes a storage section that stores a presentation material and a control section that generates an element layout changed material from the presentation material by shifting a lateral position of at least one of elements of characters and graphics contained in a region of the presentation material based on a distance from a center line indicating a center of the region with respect to a lateral direction; and
an image processing device that subjects an element layout changed material generated by the element layout changed material generating device to image processing,
wherein the image processing device comprises:
a display device;
an image pickup device that takes an image;
an indication point acquiring section that acquires an indication point on a presentation material, which a presenter is pointing out with a pointer, through performing image processing on an portion of an image of the presentation material which is a part of an entire image taken by the image pickup device;
an element layout changed material acquiring section that acquires the element layout changed material from the element layout changed material generating device;
a changed indication point determining section that determines as a changed indication point a point on the element layout changed material corresponding to the indication point acquired by the indication point acquiring section;
a display image generating section that synthesizes an image of the element layout changed material acquired by the element layout changed material acquiring section with a changed indication point indicating image showing the changed indication point determined by the changed indication point determining section and generates a display image; and
a control section that allows the display device to display the entire image taken by the image pickup device after replacing the portion of the image of the presentation material with the display image.

6. An image processing system comprising:
an element layout changed material generating device that includes a storage section that stores a presentation material and a control section that generates an element layout changed material from the presentation material by shifting a lateral position of at least one of elements of characters and graphics contained in a region of the presentation material based on a distance from a center line indicating a center of the region with respect to a lateral direction; and
an image processing device that subjects an element layout changed material generated by the element layout changed material generating device to image processing,
the image processing device comprising:
a display device;
an image pickup device that takes an image;
an indication point acquiring section that acquires an indication point on a presentation material, which a presenter is pointing out with a pointer, through performing image processing on an portion of an image of the presentation material which is a part of an entire image taken by the image pickup device;
an element layout changed material acquiring section that acquires the element layout changed material from the element layout changed material generating device;
a changed indication point determining section that determines as a changed indication point a point on the element layout changed material corresponding to the indication point acquired by the indication point acquiring section; and
a display image generating section that synthesizes an image of the element layout changed material acquired by the element layout changed material acquiring section with a changed indication point indicating image showing the changed indication point determined by the changed indication point determining section and generates a display image,
wherein in the element layout changed material generating device, when the element is positioned away from the center line, the control section generates the element layout changed material from the presentation material by shifting a lateral position of the element to a position laterally opposite with respect to the center line and away from the center line by a distance equal to that from the center line to an original position.

7. The image processing system according to claim 6, wherein in the element layout changed material generating device, the control section executes a processing for changing positions of the element with respect to the lateral direction without inverting the element.

8. An image processing system comprising:
an element layout changed material generating device that includes a storage section that stores a presentation material and a control section that generates an element layout changed material from the presentation material by shifting a lateral position of at least one of elements of characters and graphics contained in a region of the presentation material based on a distance from a center line indicating a center of the region with respect to a lateral direction; and an image processing device that subjects an element layout changed material generated by the element layout changed material generating device to image processing, the image processing device comprising:

a display device;

an image pickup device that takes an image;

an indication point acquiring section that acquires an indication point on a presentation material, which a presenter is pointing out with a pointer, through performing image processing on an portion of an image of the presentation material which is a part of an entire image taken by the image pickup device;

an element layout changed material acquiring section that acquires the element layout changed material from the element layout changed material generating device;

a changed indication point determining section that determines as a changed indication point a point on the element layout changed material corresponding to the indication point acquired by the indication point acquiring section; and a display image generating section that synthesizes an image of the element layout changed material acquired by the element layout changed material acquiring section with a changed indication point indicating image showing the changed indication point determined by the changed indication point determining section and generates a display image, wherein in the element layout changed material generating device, the control section generates the element layout changed material from the presentation material by shifting the lateral position of the element to a position laterally opposite with respect to the vertical center line of the region, the position being where a distance from one end of the element to the center line with respect to the lateral direction becomes equal to a distance from the other end of the element in the original position before shifts in the lateral direction to the center line.

9. The image processing system according to claim 8, wherein in the element layout changed material generating device, the control section executes the processing for changing positions of the element with respect to the lateral direction without inverting the element.

10. A computer-readable non-transitory storage medium storing an image processing program that allows a computer to operate as:

a storage section that stores a presentation material; and a control section that generates an element layout changed material from the presentation material by shifting a lateral position of at least one of elements of characters and graphics contained in a region of the presentation material based on a distance from a center line indicating a center of the region with respect to a lateral direction, wherein the image processing program further allows the computer to operate so that when the element is positioned away from the center line, the control section generates the element layout changed material from the presentation material by shifting the lateral position of the element to a position laterally opposite with respect to the center line and away from the center line by a distance equal to that from the center line to an original position.

11. The computer-readable non-transitory storage medium with the image processing program stored thereon according to claim 10, wherein the image processing program further allows the computer to operate so that the control section executes a processing for changing positions of the element with respect to the lateral direction without inverting the element.

12. A computer-readable non-transitory storage medium storing an image processing program that allows a computer to operate as:

a storage section that stores a presentation material; and a control section that generates an element layout changed material from the presentation material by shifting a lateral position of at least one of elements of characters and graphics contained in a region of the presentation material based on a distance from a center line indicating a center of the region with respect to a lateral direction, wherein the image processing program further allows the computer to operate so that when the element is positioned on the center line, the control section generates the element layout changed material from the presentation material by shifting the lateral position of the element to a position laterally opposite with respect to the vertical center line of the region, the position being where a distance from one end of the element to the center line with respect to the lateral direction becomes equal to a distance from the other end of the element in the original position before shifts in the lateral direction to the center line.

13. The computer-readable non-transitory storage medium with an image processing program stored thereon according to claim 12, wherein the image processing program further allows the computer to operate so that the control section executes the processing for changing positions of the element with respect to the lateral direction without inverting the element.

* * * * *